(12) United States Patent
Taulbee et al.

(10) Patent No.: US 9,428,705 B2
(45) Date of Patent: Aug. 30, 2016

(54) ENHANCEMENT OF BINDING CHARACTERISTICS FOR PRODUCTION OF AN AGGLOMERATED PRODUCT

(71) Applicant: University of Kentucky Research Foundation, Lexington, KY (US)

(72) Inventors: Darrell Taulbee, Frankfort, KY (US); Robert Hodgen, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 0 days.

(21) Appl. No.: 14/200,360

(22) Filed: Mar. 7, 2014

(65) Prior Publication Data

US 2014/0262745 A1 Sep. 18, 2014

Related U.S. Application Data

(60) Provisional application No. 61/793,582, filed on Mar. 15, 2013.

(51) Int. Cl.
| | |
|---|---|
| *C10L 5/00* | (2006.01) |
| *C10L 5/28* | (2006.01) |
| *C10L 5/04* | (2006.01) |
| *C10L 5/14* | (2006.01) |
| *C10L 5/36* | (2006.01) |
| *C10L 5/44* | (2006.01) |

(52) U.S. Cl.
CPC .. *C10L 5/28* (2013.01); *C10L 5/04* (2013.01); *C10L 5/14* (2013.01); *C10L 5/361* (2013.01); *C10L 5/363* (2013.01); *C10L 5/442* (2013.01); *C10L 5/445* (2013.01); *C10L 2290/36* (2013.01); *Y02E 50/10* (2013.01); *Y02E 50/30* (2013.01)

(58) Field of Classification Search
CPC .............. C10L 5/28; C10L 5/04; C10L 5/14; C10L 5/361; C10L 5/363; C10L 4/442; C10L 5/445; C10L 2290/36; Y02E 50/10; Y02E 50/30
See application file for complete search history.

(56) References Cited

U.S. PATENT DOCUMENTS

| | | | | |
|---|---|---|---|---|
| 3,140,242 A | * | 7/1964 | Work et al. | 44/568 |
| 3,689,234 A | * | 9/1972 | Onozawa | 44/554 |
| 2009/0119981 A1 | * | 5/2009 | Drozd et al. | 44/544 |

FOREIGN PATENT DOCUMENTS

JP 2003253280 * 9/2003

* cited by examiner

*Primary Examiner* — Cephia D Toomer
(74) *Attorney, Agent, or Firm* — King & Schickli, PLLC

(57) ABSTRACT

A method is provided for preparing a product from a precursor material. The method includes the steps of (a) mixing a particulate material and a binder to form a precursor material and (b) irradiating that precursor material with microwave radiation so as to activate the binder and form the product.

16 Claims, 11 Drawing Sheets

ENHANCEMENT OF BINDING CHARACTERISTICS FOR PRODUCTION OF AN AGGLOMERATED PRODUCT

This utility patent application claims the benefit of priority in U.S. Provisional Patent Application Ser. No. 61/793,582 filed on Mar. 15, 2013, the entirety of the disclosure of which is incorporated herein by reference.

This invention was made with government support under award no. DE-FE0005293-002 awarded by the Department of Energy. The government has certain rights in this invention.

TECHNICAL FIELD

The subject matter described herein relates generally to the field of preparation of solid agglomerates or agglomerated products and more particularly to methods for this purpose including methods for the production of fuels for combustion such as coal, biomass and combinations of coal and biomass.

BACKGROUND

This document relates to the concept of utilizing microwave radiation to activate a binder and enhance the desirable characteristics of the binder when used in the production of agglomerated products from particulate materials and binders. More specifically, agglomerating products made with microwave activated binders generally show a surprising improvement in compressive strength and in many cases also demonstrate an improved resistance to attrition (attrition index).

While agglomerating products made with the current method will have a number of ultimate uses and applications, the production of agglomerated fuel products is of particular interest. An estimated 2 billion tons of recoverable coal fines have been discarded in impoundments in the US with about 50 millions more tons added each year. This is a substantial resource that can be economically cleaned and separated into a low-ash product. However, it is not yet economically feasible to utilize such recovered fines due to obstacles associated with handling and high moisture content (i.e., low net Btu content). Drying and then forming the coal fines into agglomerates via briquetting, pelletization, extrusion, or other agglomeration techniques yields a product that is amenable to transport, storage, and handling in conventional coal-processing equipment Likewise, while there is a growing demand for 'green energy' that could be supplied to some extent by timber and agricultural waste residues, the low energy density of this material coupled with the costs for transport, processing, storage, and combustion of this material represents a formidable obstacle to utilization.

Extrusion is the most common technology for forming biomass into a pelletized fuel. However, extrusion is an energy intensive process that is limited in capacity, problematic to maintain a consistent production rate, and leads to excessive equipment erosion due to the high pressure required. The growing market for 'green energy' could be supplied more cheaply by direct briquetting of the biomass or the co-briquetting of biomass and coal fines. This may be particularly true for briquetting of biomass as briquetting is a lower-energy, higher-throughput, and lower-equipment erosion technology compared to extrusion. However, two of the more daunting economic obstacles to producing briquettes are the 1) cost of drying the fine coal and/or biomass and 2) binder costs. The present methods address both of these obstacles.

SUMMARY

A method of preparing a product from a precursor material may be generally described as comprising mixing a particulate material and a binder to form a precursor material and irradiating that precursor material with microwave radiation so as to activate the binder and form the product.

In one possible embodiment the method includes selecting the particulate material from a group consisting of wood, paper, plastic, coal fines, biomass, low moisture bituminous coal fines, high moisture bituminous coal fines, sub-bituminous coal fines, lignite, anthracite coal fines, wheat straw, corn stover, switch grass, miscanthus, hemp, willow, sorghum, sugar cane, bamboo, poplar, oak, wood chips, saw dust, municipal solid waste, yard clippings, leaves and mixtures thereof. In one possible embodiment the method includes selecting the binder from a group consisting of starch, wheat starch, corn starch, unmodified wheat starch, unmodified corn starch, glycerol, maleic anhydride, anhydrides, polyvinyl alcohol, polyvinyl acetates, polyols, polysaccharides, chemically-similar water-soluble polymers and mixtures thereof.

In one possible embodiment the method includes providing the precursor material with a moisture content of between 0-45 weight percent prior to activating by microwave radiation. In one possible embodiment that moisture content is between 0-10 weight percent. In another possible embodiment the method includes providing the precursor material with a moisture content of between 15-35 weight percent prior to activating by microwave radiation. In yet another possible embodiment the method includes providing the precursor material with a moisture content of between 5-25 weight percent prior to activating by microwave radiation.

In one possible embodiment the method includes bringing the precursor material to a temperature of between 100-125° C. during irradiation to activate the binder and form the agglomerated product. In another possible embodiment the method includes bringing the precursor material to a temperature of between 100-160° C. during irradiation to actuate the binder and form the agglomerated product. In another possible embodiment the method includes using a binder of polyvinyl alcohol in combination with a second binder material selected from a group consisting of starch, corn starch, wheat starch, unmodified corn starch, unmodified wheat starch, pregelatinized corn starch, pregelatinized wheat starch and mixtures thereof wherein the weight ratio of polyvinyl alcohol to second binder material is between 1 to 0.1 and 1 to 10. In another possible embodiment the method includes using a binder of glycerol in combination with a second binder material selected from a group consisting of maleic anhydride, phthalic anhydride, other anhydrides and mixtures thereof wherein the weight ratio of glycerol to second binder material is between 2 to 1 and 1 to 2.

In yet another possible embodiment the agglomerated product is a fuel product and the mixing step includes mixing between 0-99.5 weight percent coal fines, 0-99.5 weight percent biomass and 0.5-10.0 weight percent binder. In one embodiment the method includes forming the agglomerated fuel product into a briquette. In another embodiment the method includes extruding the agglomerated fuel product into an extrudate. In another embodiment the method includes forming the agglomerated fuel product into a puck. In still another embodiment the method includes forming the agglomerated product into a pellet via pan pelletization.

These and other embodiments of the present method will be set forth in the description which follows, and in part will become apparent to those of ordinary skill in the art by reference to the following description and referenced drawings or by practice of the method.

BRIEF DESCRIPTION OF THE DRAWINGS

The accompanying drawings incorporated herein and forming a part of the specification, illustrate several aspects of the present method and together with the description serve to explain certain principles thereof. In the drawings.

Figure 1A:
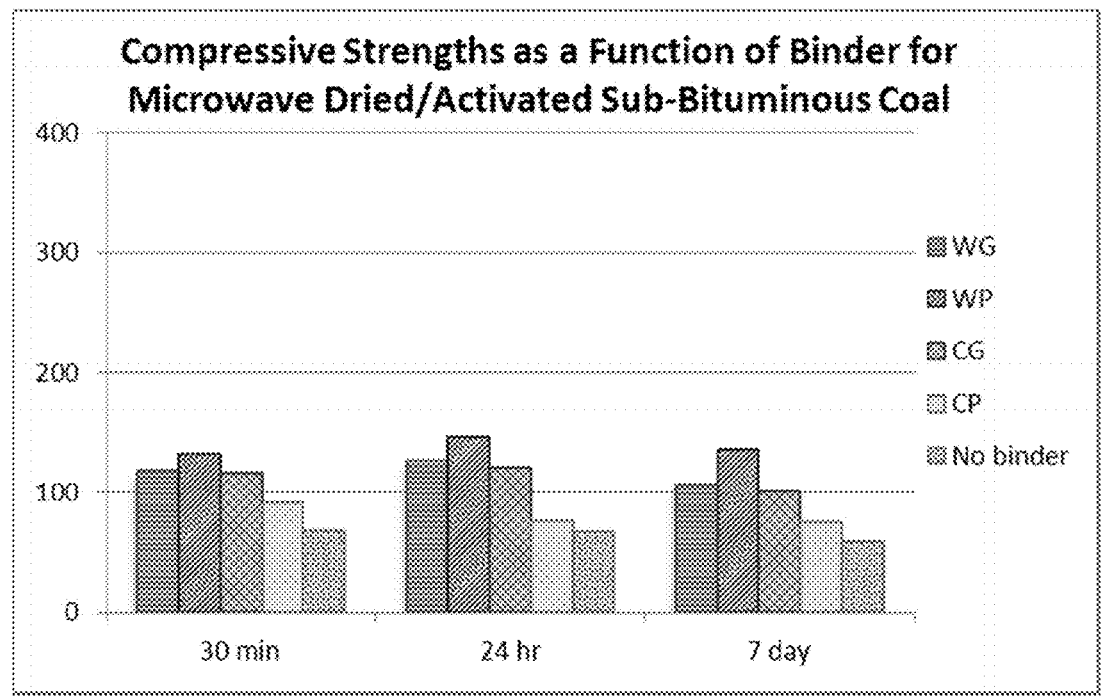
FIG. 1A and FIG. 1B show compressive strengths as a function of binder type for microwave dried/activated sub-bituminous and bituminous coal; All four starch binders were added at the same concentration by weight (WG-gelatinized wheat starch; WP-unmodified wheat starch; CG-gelatinized corn starch; CP-unmodified corn starch).

Reference will now be made in detail to the present preferred embodiments of the method, examples of which are illustrated in the accompanying drawings.

DETAILED DESCRIPTION

For purposes of this document, the term "binder" includes binders and binder precursors which act as binders upon activation with microwave radiation.

A method is provided for preparing a product from a precursor material. The method may be broadly described as comprising the steps of mixing a particulate material and a binder to form a precursor material and irradiating that precursor material with microwave radiation so as to dry the precursor material and activate the binder to form the product.

The microwave radiation applied to the precursor material and binder after mixing/blending serves to improve or endow binding characteristics to the binder which then functions as a glue for the agglomeration of the particulate starting material. Following irradiation, the product may be (1) an agglomerate of the particulate material and binder or may remain as (2) a loose blend of discrete particles depending upon the nature of the binder used and its concentration. The latter type of product is particularly amenable to a subsequent agglomeration step such as compression, briquetting extrusion or disk pelletization.

In one possible embodiment the method includes selecting the particulate material from a group including but not necessarily limited to wood, paper, plastic, coal fines, biomass, low moisture bituminous coal fines, high moisture bituminous coal fines, sub-bituminous coal fines, lignite, anthracite coal fines, wheat straw, corn stover, switch grass, miscanthus, hemp, willow, sorghum, sugar cane, bamboo, poplar, oak, wood chips, saw dust, municipal solid waste, yard clippings, leaves and mixtures thereof.

In one possible embodiment the method includes selecting the binder from a group consisting of starch, wheat starch, corn starch, unmodified wheat starch, unmodified corn starch, glycerol, maleic anhydride, anhydrides, polyvinyl alcohol, polyvinyl acetates, polyols, polysaccharides, and other chemically-similar water-soluble polymers and mixtures thereof. In yet another, alternative embodiment the method includes using a binder of polyvinyl alcohol in combination with a second binder material selected from a group consisting of starch, corn starch, wheat starch, unmodified corn starch, unmodified wheat starch, pregelatinized corn starch, pregelatinized wheat starch and mixtures thereof wherein the weight ratio of polyvinyl alcohol to second binder material is between 1 to 0.1 and 1 to 10. In another possible embodiment the method includes using a binder of glycerol in combination with a second binder material selected from a group consisting of maleic anhydride, phthalic anhydride, other anhydrides and mixtures thereof wherein the weight ratio of glycerol to second binder material is between 2 to 1 and 1 to 2.

In one possible embodiment the method includes providing the precursor material with a moisture content of between 0-45 weight percent prior to activating by microwave radiation. In one possible embodiment the method includes providing the precursor material with a moisture content of between 0-10 weight percent prior to activating with microwave radiation. In one possible embodiment the method includes providing the precursor material with a moisture content of between 5-25 weight percent prior to activating with microwave radiation. In another possible embodiment the method includes providing the precursor material with a moisture content of between 15-35 weight percent prior to activating by microwave radiation. In yet another possible embodiment the method includes providing the precursor material with a moisture content of between 20-25 weight percent prior to activating by microwave radiation. Still further, in one possible embodiment the method includes bringing the precursor material to a temperature of between 100-160° C. during irradiating to activate said binder and form said agglomerated product.

In one particularly useful embodiment of the present invention the product is a fuel product and the mixing step includes mixing between 0-99.5 weight percent coal fines, 0-99.5 weight percent biomass and 0.5-10.0 weight percent binder. The method may then further include forming the fuel product into a briquette. In an alternative embodiment the method includes extruding the fuel product into an extrudate. In yet another alternative embodiment the method includes forming the fuel product into a puck. In still another possible embodiment the method includes forming the fuel product into a pellet in a pan or disk pelletizer. In still another embodiment, the method includes compressing the fuel product into an agglomerated mass.

It should be appreciated that substantially any type of coal fines may be added to the precursor and then converted into an agglomerated product with improved strength and attrition index. This includes low moisture bituminous coal fines (between 0-10 weight percent moisture), high moisture bituminous coal fines (between 10-30 weight percent moisture), sub-bituminous coal fines (between 15-40 weight percent moisture) and lignite fines (between 15-40 weight percent moisture). In one embodiment bituminous coal fines with 5-25 weight percent moisture content are processed. In another embodiment sub-bituminous coal fines with 15-35 weight percent moisture content are processed. In yet another embodiment raw biomass with a moisture content of up to or over 40 weight percent is processed.

The following experimental examples are presented to further illustrate the product that may be made by irradiating the precursor material with microwave radiation so as to activate the binder. Advantageously, the resulting agglomerated product has surprisingly enhanced compressive strength characteristics and in many instances an improved attrition index thereby enhancing the use of the product for a number of subsequent applications.

EXPERIMENT 1

Coal Briquetting

In an initial set of experiments, four samples of bituminous coal fines were blended with 5 percent by weight of either a gelatinized wheat starch (WG), an unmodified wheat starch (WP), a gelatinized corn starch (CG), or an unmodified corn starch (CP)[1], respectively. Four additional samples were prepared in a similar manner only using sub-bituminous coal fines. Two additional samples, one consisting of bituminous coal fines and one of sub-bituminous fines, were tested without adding starch. This provided a total of ten samples (four with a gelatinized starch, four with an unmodified starch, and two without starch). These ten samples were then riffled into two equivalent splits each for a total of twenty samples.

[1] Unmodified starch is marked as Pearl starch, thus the 'P' designated.

One sample from each pair of splits was heated in an industrial microwave oven at a nominal power setting of 15 kw until a targeted bed temperature was achieved. Each of these samples was removed from the oven, weighed to determine water loss during the microwave-heating step and immediately briquetted. The remaining ten splits were placed into a drying oven at ~200° F. (93° C.). Weight loss for each of these latter was monitored until the extent of water removal matched that measured for their counterpart split during microwave drying. These thermally-dried samples were also immediately briquetted on achieving the equivalent moisture reduction. Each of the briquette samples was then stored in an environmental chamber at a constant temperature (72° F. or 22° C.) and relative humidity (70 %) for seven days. The average compressive strength of 18 randomly selected briquettes was determined at 30 minutes, 24 hours, and 7 days following formation. The attrition indices were determined at 7 days following formation by tumbling several briquettes in a 12-inch-diameter cylinder equipped with lifters for 5 minutes. The amount of +4 mesh particles remaining after tumbling was determined and an attrition index calculated as the weight of +4 mesh particles divided by the initial weight of briquettes loaded to the cylinder. Higher attrition indices indicate greater durability.

Figure 1B:
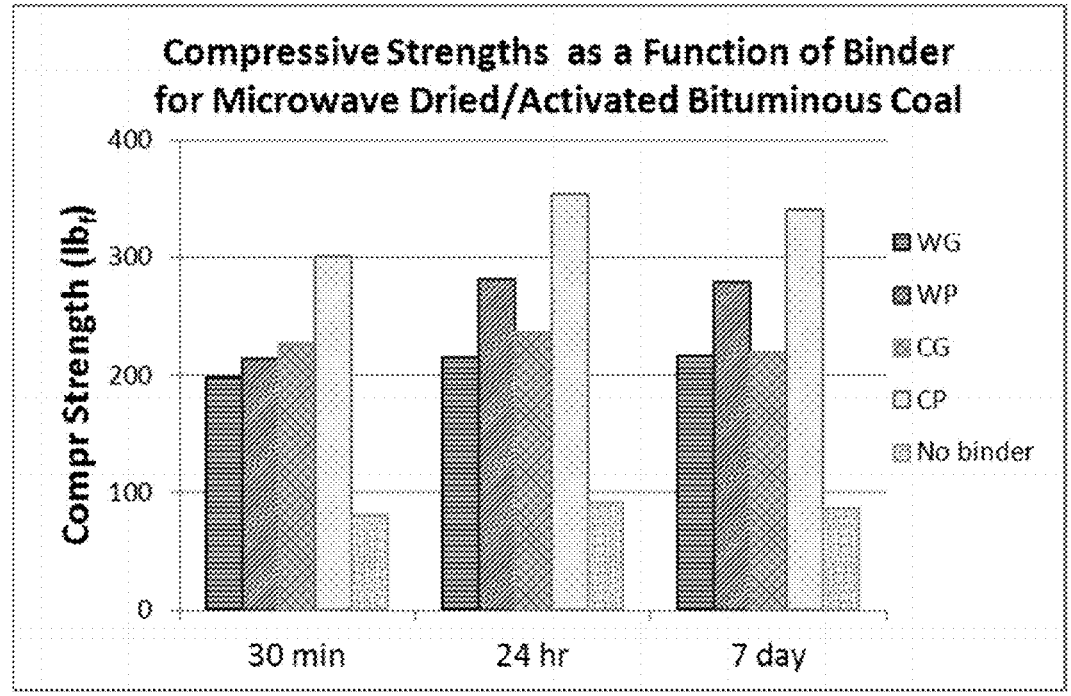

Results. Compressive strengths for the microwave dried samples of sub-bituminous and bituminous coals are compared in FIG. 1A and FIG. 1B, respectively. Compressive strengths at all evaluation intervals for all of the sub-bituminous and bituminous samples were higher in the 8 starch-containing samples relative to the 2 samples processed without a binder. This is particularly obvious for the briquettes made with bituminous coal fines. For the sub-bituminous coal, the unmodified wheat starch (WP) produced briquettes with better compressive strengths than exhibited by the briquettes made with pre-gelatinized wheat starch (WG). Compressive strengths for the briquettes made with bituminous coal fines and the two unmodified starches were higher than their counterparts made with the same concentration of the two pre-gelatinized starches. This is a significant result considering that the concentration of starch added was the same in each sample and yet the pre-gelatinized starches have a market price nearly three times greater than that of unmodified starch. Also note that the compressive strength for the briquettes made with unmodified corn starch (CP) were greater than the briquette samples made with either modified or unmodified wheat starch. This is despite the fact that the current market price for unmodified corn starch is approximately 20% lower than that of unmodified wheat starch (WP) and less than a third that of pre-gelatinized wheat starch (WS-G). These results demonstrate how one may reduce the cost of binder when forming fuel briquettes.

Figure 2A:
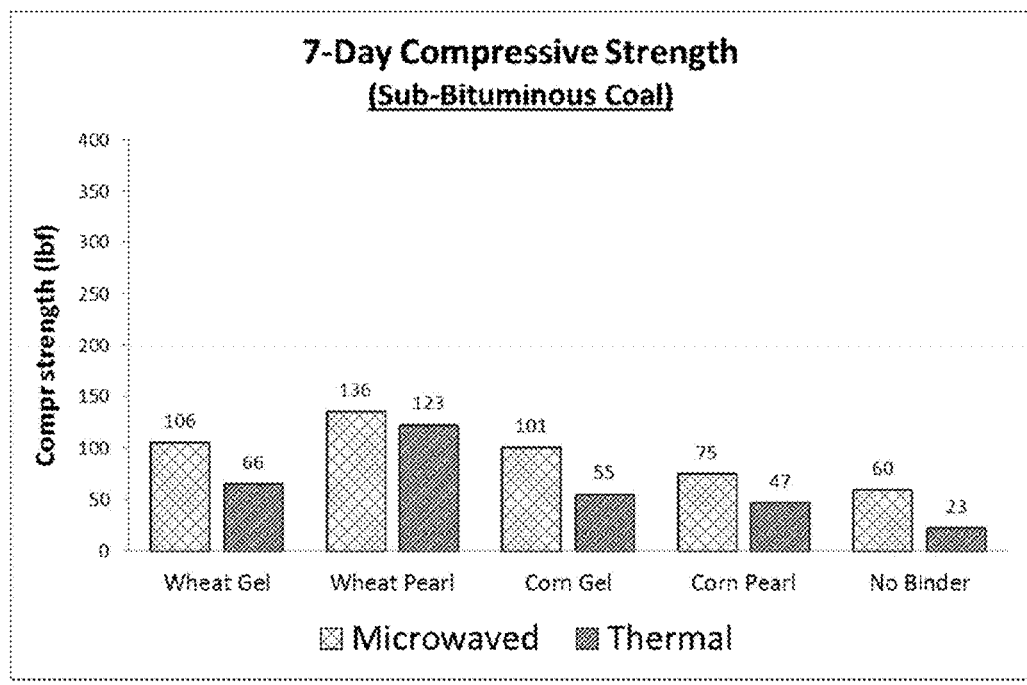
FIG. 2A and FIG. 2B show 7-day compressive strengths for briquettes made with thermally- versus microwave-dried and activated bituminous coal fines and sub-bituminous coal fines; All four starch binders were added at the same concentration by weight (Wheat Gel-gelatinized wheat starch; Wheat pearl-unmodified wheat starch; Corn Gel-gelatinized corn starch; Corn pearl-unmodified corn starch.
Figure 2B:
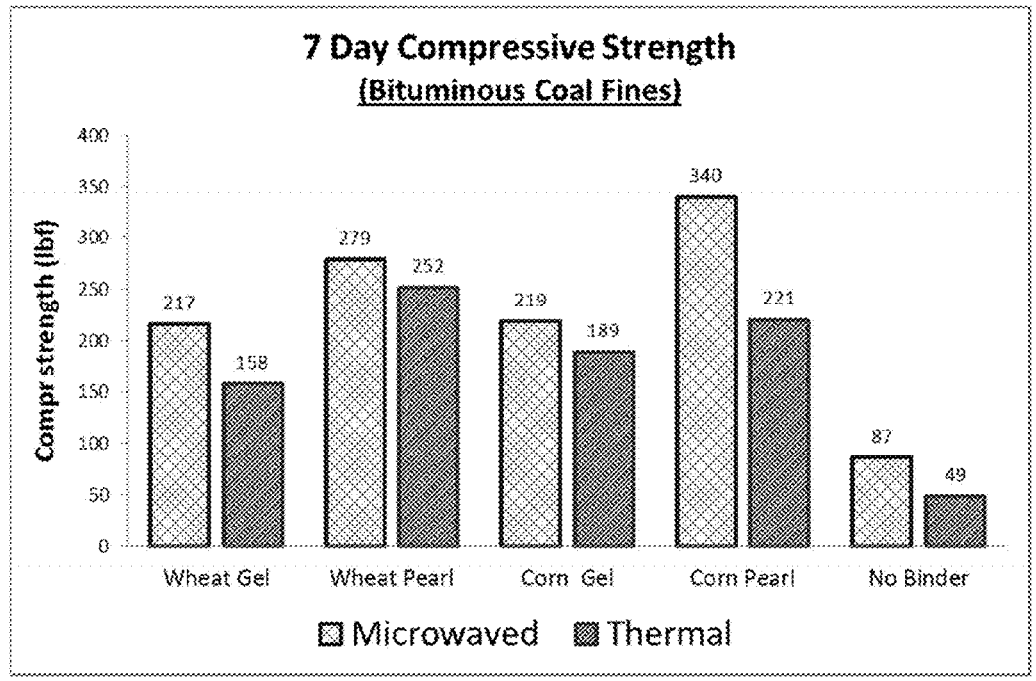

FIGS. 2A and 2B show the 7-day compressive strengths for briquettes that were made from blends of coal without an added binder or from coal blended with 5% starch and which were dried prior to briquetting either thermally in a drying oven (~200° F.) or with microwave radiation. All blends were briquetted while still hot. In all cases, the compressive strengths for the microwaved samples are higher than in their thermally-dried counterparts. These plots show unambiguous evidence that briquettes made from samples following microwave drying have significantly greater compressive strengths than equivalent blends that were thermally dried.

Figure 3:
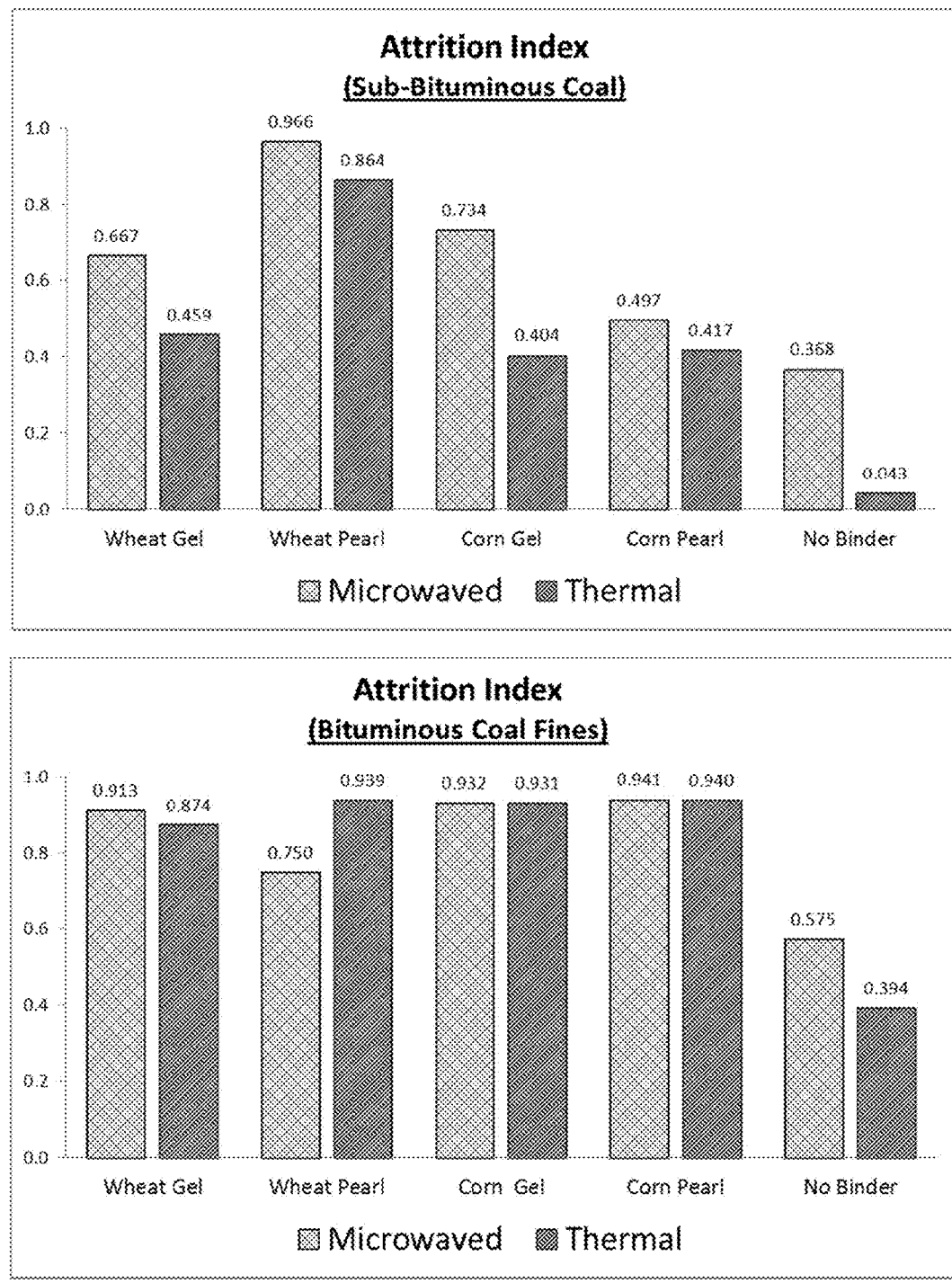
FIG. 3 shows comparison of attrition indices for microwave and thermally dried/activated briquette samples made from sub-bituminous (top) and bituminous coal fines (bottom); All four starch binders were added at the same concentration by weight (Wheat Gel-gelatinized wheat starch; Wheat pearl-unmodified wheat starch; Corn gel-gelatinized corn starch; Corn pearl-unmodified corn starch.
Figure 4:
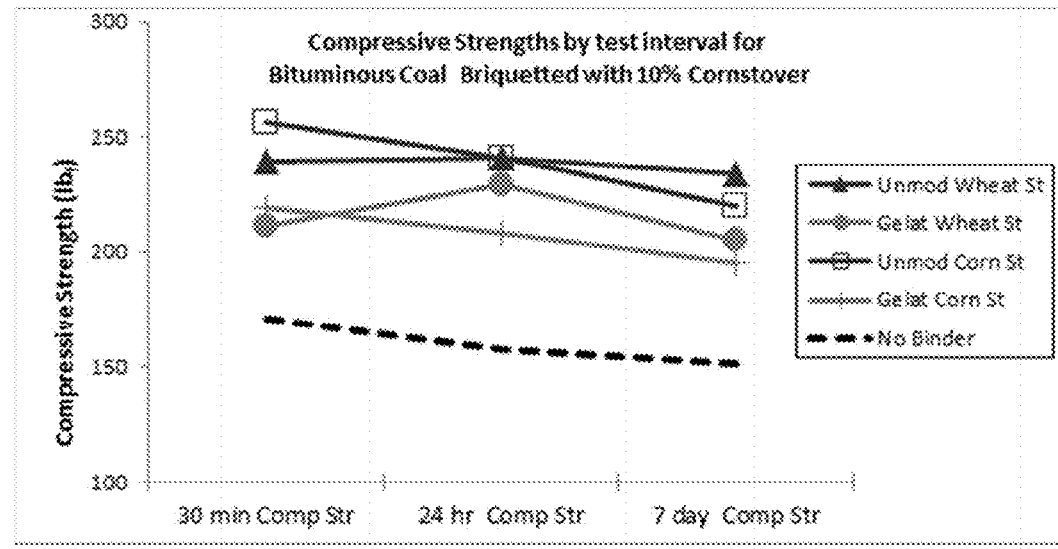
FIG. 4 shows compressive strength as a function of cure time for briquettes formed from microwave-dried blends of bituminous coal and 10% biomass. All four starch binders were added on an equivalent-cost basis.
Figure 5:
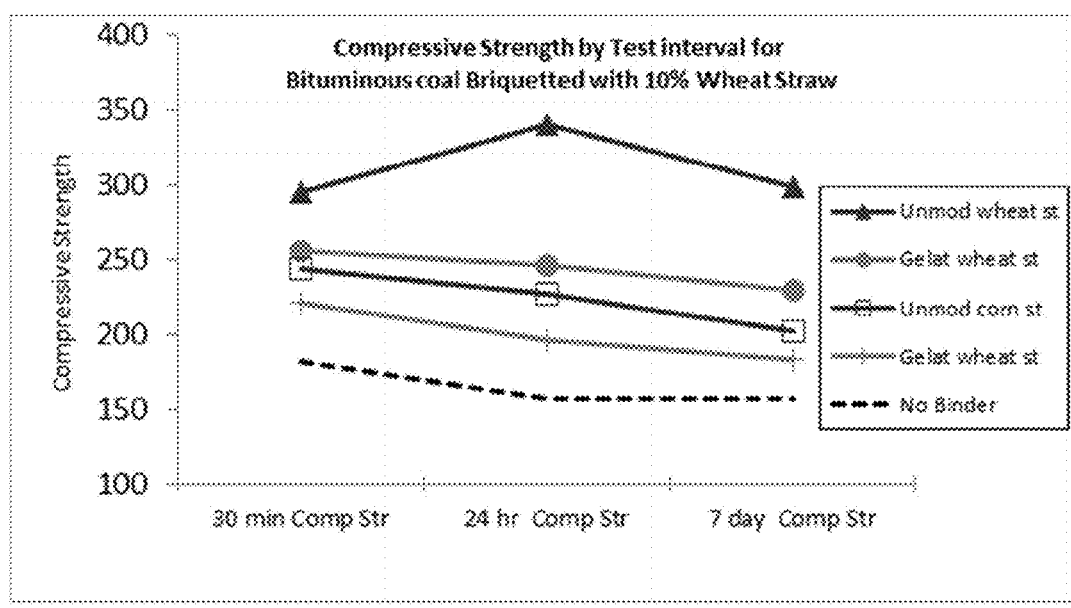
FIG. 5 shows compressive strength as a function of cure time for briquettes formed from microwave-dried blends of bituminous coal fines and 10% biomass; all four starch binders were added on an equivalent-cost basis.
Figure 6:
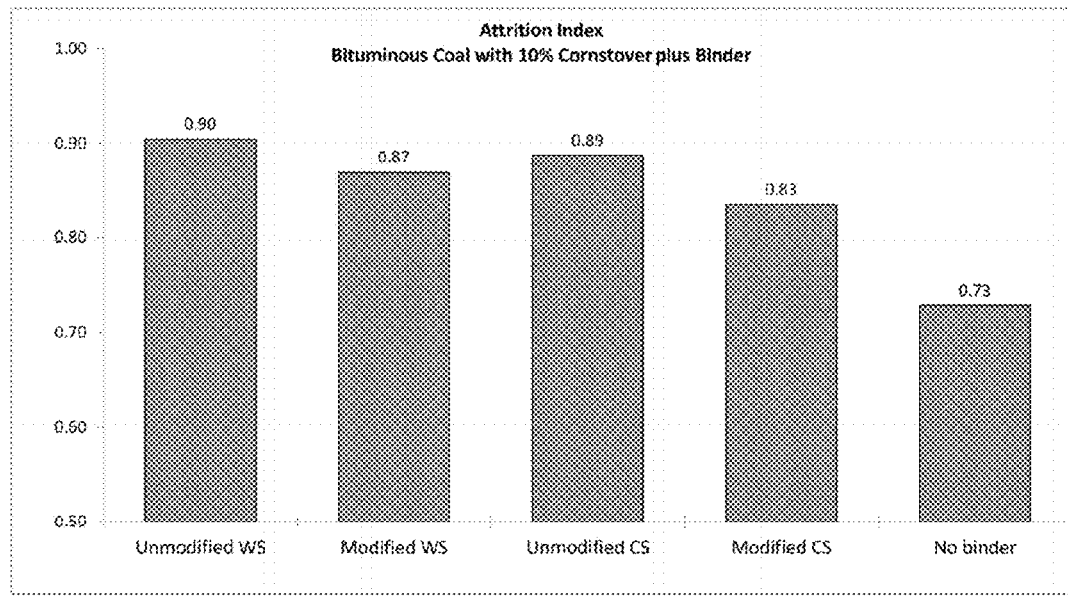
FIG. 6 shows attrition indices for briquettes formed from blends of microwave-dried bituminous coal fines and 10% corn stover plus binder; All four starch binders were added on an equivalent-cost basis (WS-wheat starch; CS-corn starch; modified=gelatinized).
Figure 7:
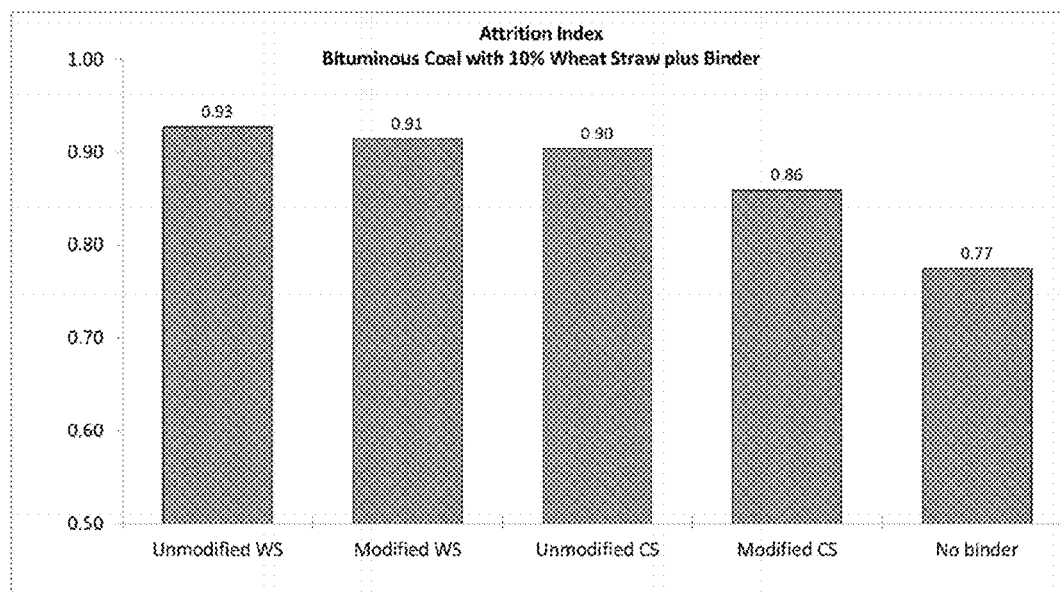
FIG. 7 shows attrition indices for briquettes formed from microwave-dried blends of bituminous coal fines and 10% wheat straw plus binder; All four starch binders were added on an equivalent-cost basis. (WS-wheat starch; CS-corn starch; modified=gelatinized).

Comparisons of attrition indices (AI) for this same set of thermally or micro-wave dried samples are shown in FIGS. 3A and 3B (e.g. comparison of attrition indices for microwave and thermally dried/activated briquette samples made from sub-bituminous (top) and bituminous coal fines (bottom)). Similar to the trends in FIG. 2 and with one exception, the attrition indices for the microwaved samples are higher than for their thermally-dried counterparts.

Additional compressive strength and attrition indices are shown in FIG. 4 through FIG. 7. These experiments were conducted in the same manner described above only the precursor material contained either 10 percent by weight of corn stover or wheat straw with a corresponding reduction of 10 percent by weight of the coal component. The briquettes that contained unmodified starch generally exhibited durability that was as good as or better than the briquettes that contained the more expensive pre-gelatinized wheat starch. These plots demonstrate that equivalent durability can be obtained with blends of coal and biomass when a less expensive unmodified starch is activated with microwave radiation compared to equivalent blends made with a more expensive pre-activated binder.

EXPERIMENT 2

Briquetting of Coal-Biomass Blends

In a second set of experiments, modified and unmodified starch and biomass were blended with bituminous and sub-bituminous coal fines at 10% and 30 wt % by weight. Both modified and unmodified corn starches were tested at a 10% biomass addition rate but only unmodified corn starch was tested with 30% biomass. Unlike the previous experiments in which the modified and unmodified starches were all added at a concentration of 5 wt %, for these experiments, the starches were added on a cost-equivalent basis of $25/ton of briquetted product based on the current F.O.B market price of each starch plus an estimated delivery cost of $30/ton. This approach results in less of the more expensive starches and more of the less expensive starches being added. However, an exception was made for pre-gelatinized wheat starch whose high market price ($1,500/ton) would result in an ineffectively-low rate of addition using a cost-equivalent addition rate. Instead of using the F.O.B. price for pre-gelatinized wheat starch, it was assumed that the lower-cost unmodified starch can be modified on site for an estimated $100/ton. The starch addition rates used in this study are given in Table 1.

Each combination of coal, biomass, and starch was blended in an industrial-grade kitchen blender, heated in a 30-kw microwave to a targeted bed temperature (between 215 and 250° F.) and then briquetted and tested the same as described earlier for coal briquettes prepared w/o biomass.

TABLE 1

Addition rates for biomass, coal, and starches in each of the coal/biomass blends. WS-Gel, gelatinized wheat starch; WS-unmod, unmodified wheat starch; CS-Gel, gelatinized corn starch; CS-unmod, unmodified corn Starch; ([a]it was assumed WS-unmod could be gelatinized on site for ~$100/ton).

| Starch | Estimated delivered price ($/ton) | 10% biomass blends | | | 30% biomass blends | | |
| --- | --- | --- | --- | --- | --- | --- | --- |
| | | Starch (wt %) | Corn Stover (wt %) | Coal (wt %) | Starch (wt %) | Wheat starch (wt %) | Coal (wt %) |
| WS-Gel[a] | $630 | 4.0 | 6.0 | 90.0 | 4.0 | 26.0 | 70 |
| WS-unmod | $530 | 4.7 | 5.3 | 90.0 | 4.7 | 25.3 | 70 |
| CS-Gel | $830 | 3.0 | 7.0 | 90.0 | 3.0 | 27.0 | 70 |
| CS-unmod | $430 | 5.2 | 4.8 | 90.0 | 5.2 | 24.8 | 70 |

Figure 8:
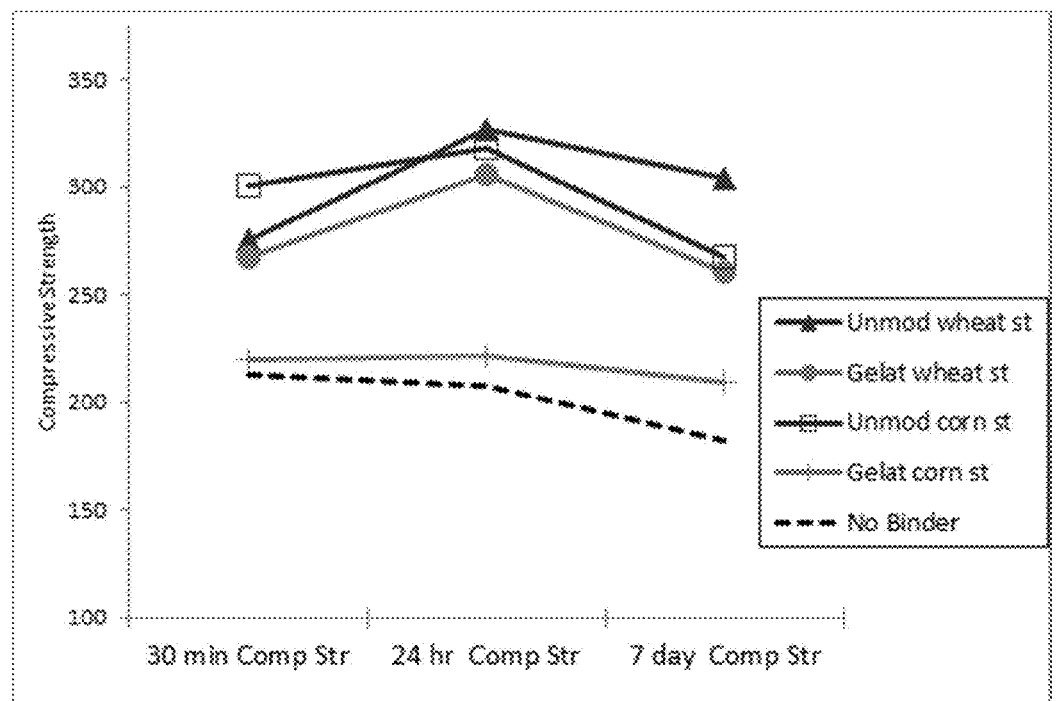
FIG. 8 shows compressive strengths by test interval for microwave-dried sub-bituminous coal briquetted with 10% corn stover straw plus starch binder; All four starch binders were added on an equivalent-cost basis.
Figure 9:
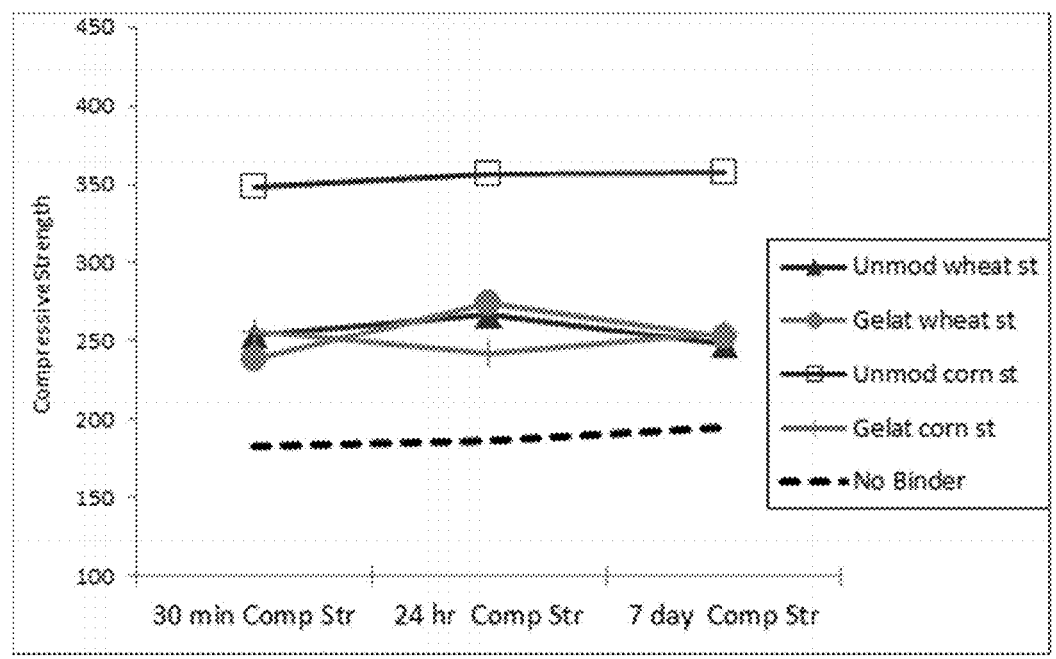
FIG. 9 shows compressive strengths by test interval for microwave-dried sub-bituminous coal briquetted with 10% wheat straw both with and without a starch binder. Binders were added on an equivalent-cost basis.
Figure 10:
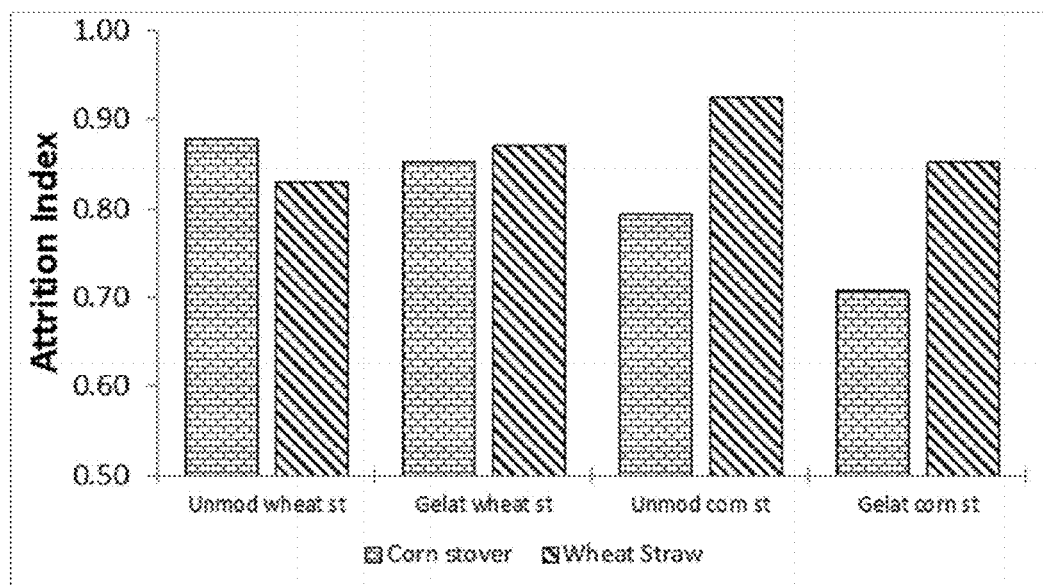
FIG. 10 shows attrition indices for briquettes made with microwave-dried sub-bituminous coal blended with 10% corn stover or wheat straw and a starch binder.

Sub-Bituminous Coal and 10% Biomass. Compressive strengths for sub-bituminous coal co-briquetted with 10% biomass are shown in FIG. 8 and FIG. 9 with resistance to attrition (attrition index) shown in FIG. 10. Briquettes made with sub-bituminous coal and corn stover were stronger when an unmodified starch was added prior to microwave activation than were their counterparts that were made with a cost-equivalent amount of pre-gelatinized starch. This was also observed for the briquettes made with wheat straw when an unmodified versus a pre-gelatinized corn starch was added. These trends were mirrored by the attrition-index plots for briquettes made with corn stover (FIG. 10) in which the samples made with unmodified cornstarch exhibited a greater resistance to attrition than their counterparts made with pre-gelatinized cornstarch. Results for resistance to attrition were mixed for the briquettes made with modified versus unmodified wheat starch.

Figure 11:
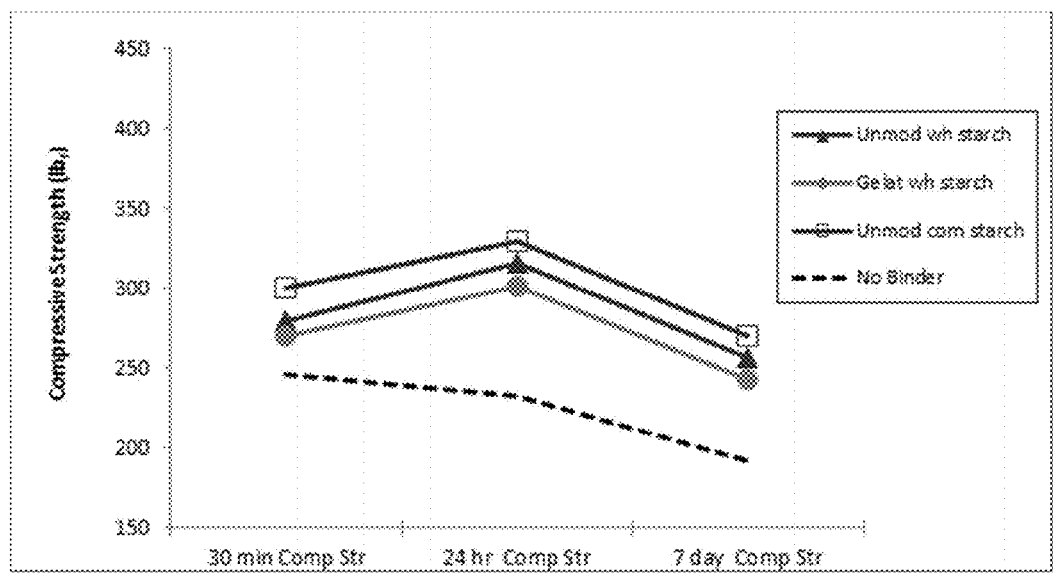
FIG. 11 shows compressive strengths by test interval for briquettes made with blends of microwave-dried bituminous coal fines and 30% wheat straw briquetted both with and without a binder; binders were added on an equivalent-cost basis.
Figure 12:
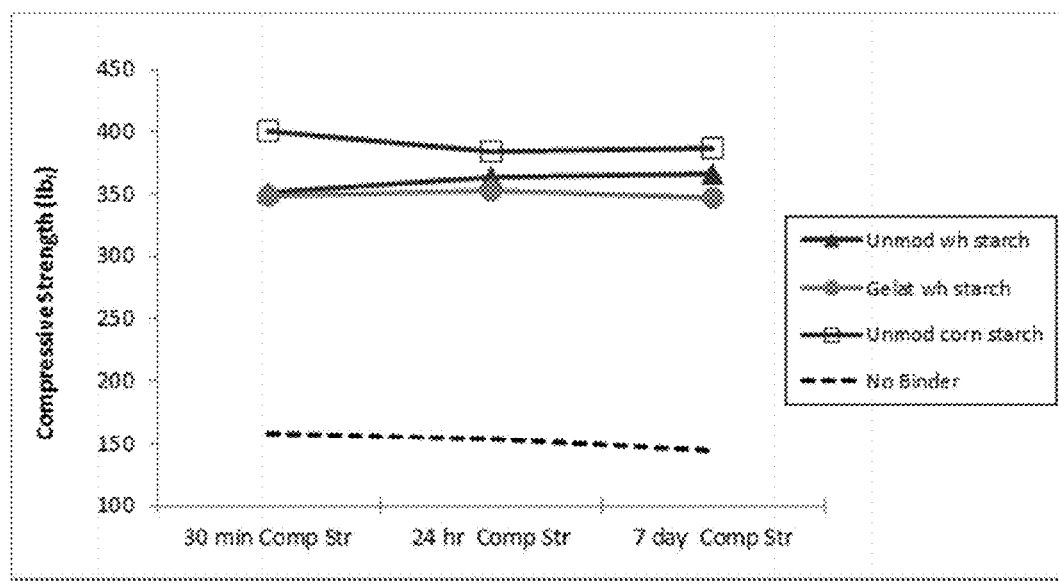
FIG. 12 shows compressive strengths by test interval for briquettes made with blends of microwave-dried sub-bituminous coal and 30% corn stover briquetted both with and without a binder; binders were added on an equivalent-cost basis.

Coal and 30% Biomass Briquettes. FIG. 11 reveals only small improvements in compressive strength for bituminous coal/30% wheat straw briquettes prepared with unmodified versus gelatinized starch with the least-expensive corn starch providing the best results for these samples. Similar results for analogous briquettes made with sub-bituminous coal and 30% wheat straw are shown in FIG. 12 and again indicate that compressive strengths obtained with unmodified corn or wheat starch were as good or better than obtained with the pre-gelatinized wheat starch.

Figure 13:
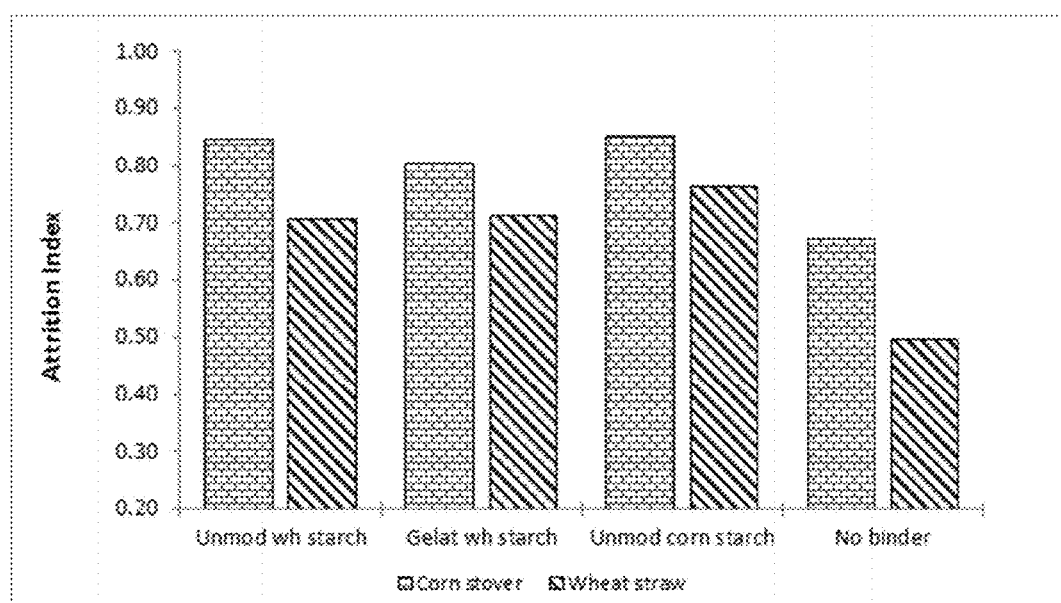
FIG. 13 shows attrition indices for briquettes made with blends of microwave-dried sub-bituminous coal and 30% biomass briquetted both with and without a binder; binders were added on an equivalent-cost basis.

The attrition indices for the 30% biomass briquettes (starch plus corn stover or wheat straw) are shown in FIG. 13. Similar to the results for compressive strengths, briquettes made with a less expensive unmodified starch generally outperformed otherwise analogous briquettes made with a pre-gelatinized starch.

As demonstrated, adding an unmodified starch prior to microwave drying and briquetting in all cases provided an equivalent and generally a more durable briquette compared to the analogous briquettes made with a pre-gelatinized starch. This is important if starch is to be used as a binder for large-scale applications as there is a limited supply and production capacity for pre-gelatinized starches in the US. Thus, the ability to use unmodified starch would lessen or eliminate this limitation.

EXPERIMENT 3

Biomass-Only Briquettes

To evaluate unmodified versus gelatinized starch as a binder for biomass-only briquettes, four samples of minus 4 mesh oak sawdust were heated/dried in a 30 kw microwave to a bed temperature of 225° F. and immediately briquetted. Three of the samples contained five percent by weight of unmodified cornstarch, unmodified wheat starch, or modified wheat starch, respectively. The fourth control sample was processed in the same manner only without a binder, i.e., sawdust only. All samples were maintained in a controlled environment at 72° F. and 50% relative humidity until tested. Compressive strengths were determined on 20-randomly selected briquettes from each briquetted sample at 30 minutes, 24 hours, and 7 days following formation.

Figure 14:
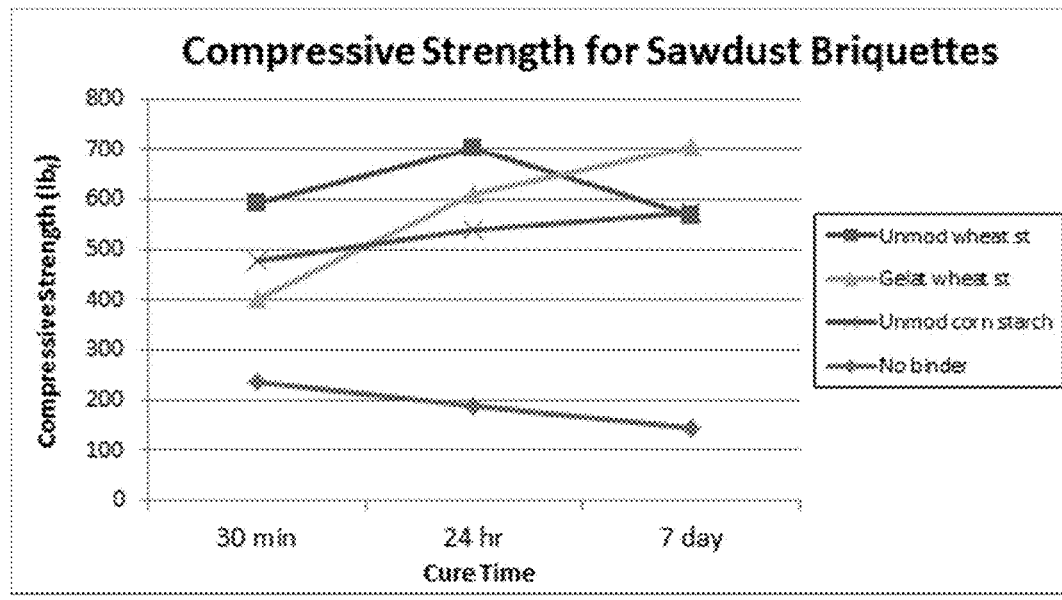
FIG. 14 shows compressive strength for briquettes made with microwave-dried sawdust formed with and without a starch binder; binders were added at 5 percent by weight.

Each of the sawdust samples lost between 30 and 35% of an initial ~41% moisture during microwave drying. As shown in FIG. 14. the average compressive strength of the briquettes obtained was remarkably high with the compressive strength of several of the individual briquettes exceeding the 1000-lb limit of the compressive-strength meter being used. In fact, the average compressive strength for the sawdust/starch briquettes were significantly higher than any of the coal or coal/biomass briquettes our laboratory tested to date when a similar amount of binder was added.

EXPERIMENT 4

Microwave Activation of Polyvinyl Alcohol

Polyvinyl alcohol (PVA) or other water soluble or miscible polymers can also be activated to serve as a coal binding agent for briquetting when irradiated with microwave radiation. Further, a significant improvement in briquette strength can be obtained even at low levels of PVA addition.

Four kilogram batches of sub-bituminous and bituminous coal both with and without PVA were loaded to a microwave oven and heated to targeted bed temperatures ranging from 225 to 250° F. (107-121° C.). Each 4-kg batch contained either 0, 20, 40, or 80 grams (0, 0.5, 1.0, or 2.0%) polyvinyl alcohol. On attaining the targeted temperature, each batch of coal or coal and PVA was removed and immediately formed into briquettes in a roll briquetter under the same briquetting conditions. In addition, two batches of bituminous coal that contained either 0 wt % or 2 wt % PVA were air dried at room temperature to equilibrium moisture then briquetted under the same conditions.

Figure 15:
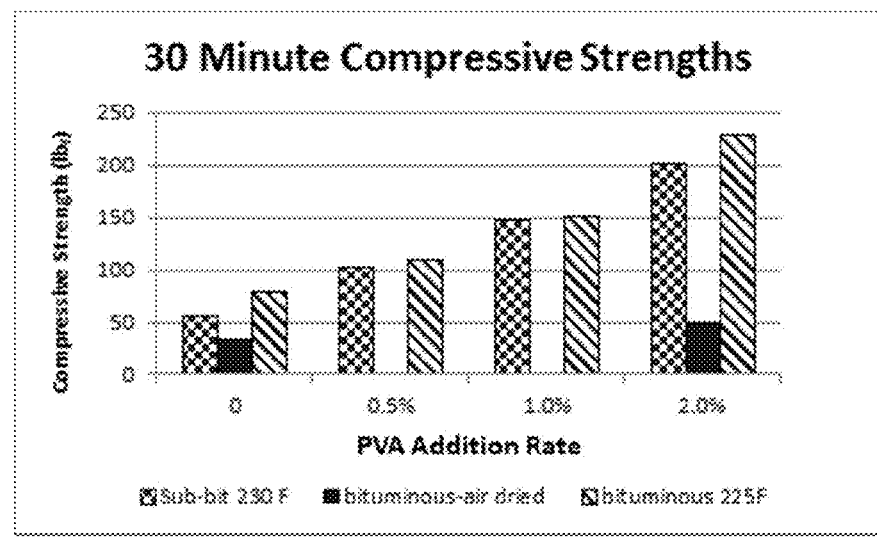
FIG. 15 shows green compressive strengths for briquettes made at ambient temperature with polyvinyl alcohol and air-dried bituminous coal or with polyvinyl alcohol and bituminous or sub-bituminous coals that were microwave heated to the indicated temperatures prior to briquetting.

Thirty minutes after formation, 30 briquettes from each batch were tested for compressive strengths with the average results from those tests plotted in FIG. 15. There is a clear and substantial increase in compressive strength with increasing PVA dosage rates for both coal types. Further, the 0% PVA samples demonstrate that some improvement in strength can be attributed to microwave heating and drying even when no binder is added. However, the 2 wt % PVA samples clearly demonstrate a substantial increase in compressive strength is obtained when the coal/PVA blend is heated and activated in a microwave oven as compared to when an otherwise identical blend is air dried before briquetting.

EXPERIMENT 5

Figure 16:
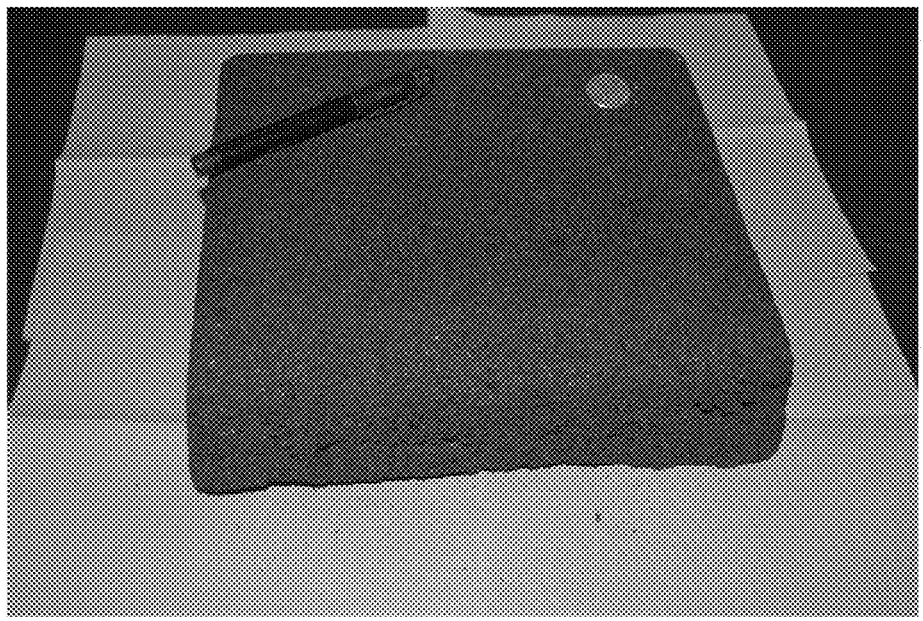
FIG. 16 shows a coal brick formed without compression by heating a blend of wet bituminous coal fines and polyvinyl alcohol with microwave radiation.

Production of Coal Agglomerates without the Need for Compression or Briquetting Following In-Situ Microwave Activation of PVA PVA was blended with about 2.5 kg of high moisture bituminous coal fines[2] at concentrations ranging from 1% to 5% by weight then loaded to plastic containers and heated to a targeted temperature in a microwave oven. During drying, the entire sample was formed into a large agglomerate (brick or cake) as shown in FIG. 16. Even at the lower 1% PVA addition rate, the brick exhibited significant durability and appeared to be suitable for shipping without the need for post-drying briquetting or compression.

[2] For purposes of this document "high moisture bituminous coal fines" include fines with a greater than 10 weight percent moisture content.

EXPERIMENT 6

Evaluation of the Relation Between Initial Sample Moisture and the Effectiveness of Microwave Binder Activation The initial moisture content of a blend of fines (e.g., coal fines) and a microwave-activated binder material can have a significant impact on the ultimate strength of the agglomerate that is formed during or after microwave heating of the blend. In one set of experiments, samples of bituminous coal fines were blended with targeted amounts of water and 3 wt % of either polyvinyl alcohol (PVA), a pre-gelatinized wheat starch, an un-gelatinized wheat starch (WP), or an un-gelatinized corn starch (CP). For a baseline comparison, samples of the bituminous coal without an added binder were adjusted to the same initial moisture level. All five blends were microwave dried to the same approximate final moisture and briquetted.

Figure 17:
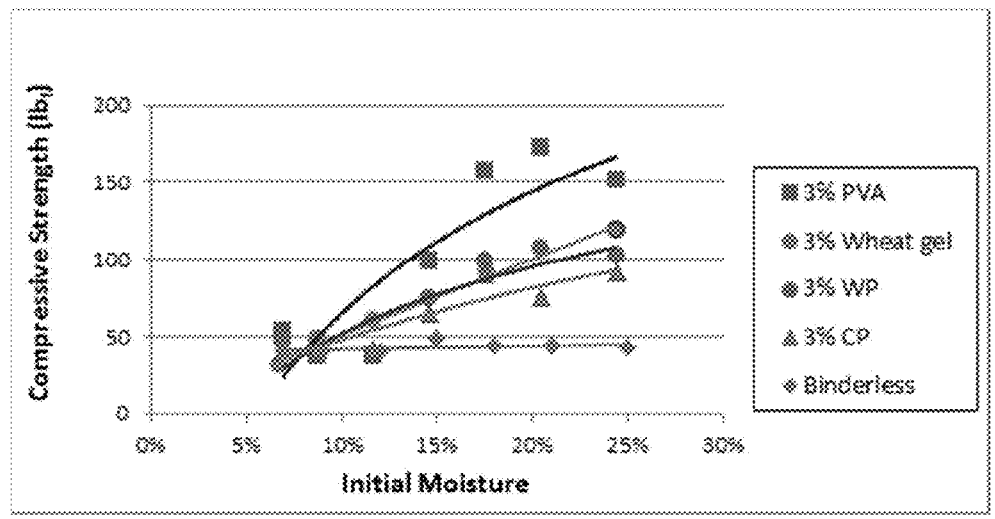
FIG. 17 shows compressive strength as a function of the initial moisture for briquettes made from microwave-dried blends of bituminous coal and binder. Results for a microwave-dried sample of bituminous coal briquetted without a binder are shown for comparison. Lines represent the best curve fits. (PVA-polyvinyl alcohol; wheat gel-gelatinized wheat starch; WP-unmodified wheat starch; CP-unmodified corn starch). All briquettes contain a total of 3 percent binder by weight except for the binderless briquettes.

The results from these experiments, shown in FIG. 17, reveal that the effectiveness of each of the binders is enhanced as the initial moisture in the blends to be exposed to microwave radiation is increased up to about 20 wt %. This has favorable implications for drying and briquetting of bituminous coal fines as the moisture content of bituminous fines available at a coal cleaning facility or from a slurry impoundment is in often this approximate range. Also note that the performance of the unmodified starches as binders, particularly the unmodified wheat starch, was similar to that of the more expensive gelatinized wheat starch.

The initial moisture content of sub-bituminous coal fines is generally higher than that of bituminous coal fines, typically ranging from 25 to 35% moisture by weight. Experiments conducted with the same four binders blended with sub-bituminous coal fines that were about 29% to about 35 wt % moisture demonstrated that the PVA, gelatinized wheat starch, unmodified wheat starch, and unmodified corn starch were highly effective briquetting binders following microwave drying.

The results in FIG. 17 indicate that of the four binder materials that were added at the same 3% dosage rate, PVA provided the strongest briquettes for a given initial moisture. PVA is also significantly more expensive than the other three materials. For example, the cost of adding ½% of PVA is about the same as adding 3% of unmodified corn or wheat starch. In an effort to combine the superior binding characteristics of PVA with the lower cost of unmodified starch, the two unmodified starches were blended with PVA at a 2:1 starch to PVA ratio. Each of these 2:1 blends was then added at 3 wt % to the bituminous coal and processed as before.

Figure 18:
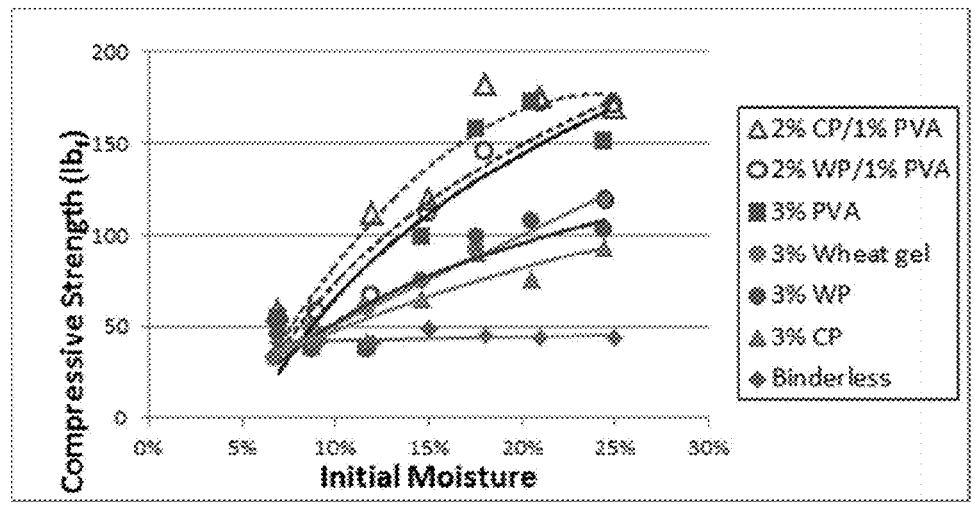
FIG. 18 shows the same compressive strength data shown in FIG. 18 plotted with compressive strength data for briquettes made with a combination of unmodified starch and PVA binder. The lines represent the best logarithmic or polynomial curve fits with dashed lines corresponding to briquettes made with 2 percent starch and 1 percent PVA binder and solid lines corresponding to briquettes made with 3 percent of a single binder (PVA-polyvinyl alcohol; wheat gel-pregelatinized wheat starch; WP-unmodified wheat starch; CP-unmodified corn starch).

Results of compressive strength testing of briquettes made from the 2:1 starch:PVA blends are plotted in FIG. 18 along with the results shown previously in FIG. 17. As can be seen, the compressive strengths of the briquettes made with 3 wt % of the 2:1 unmodified starch:PVA binders are substantially better than the strengths obtained with 3 wt % unmodified starch and are equivalent or better than the strengths of the briquettes made with 3 wt % PVA. This represents a potentially significant economic advantage considering the substantially lower cost of the unmodified starches compared to PVA.

Figure 19:
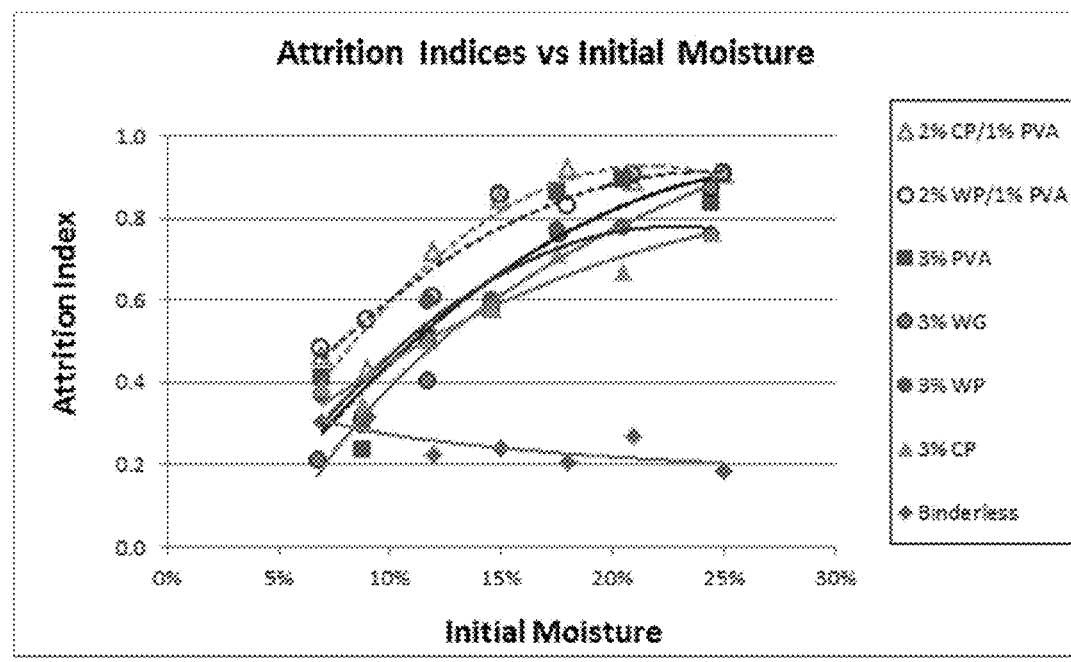
FIG. 19 shows attrition indices for the same briquetted samples as shown in FIG. 18. The lines represent the best logarithmic or polynomial curve fits with dashed lines corresponding to briquettes made with 2 percent starch and 1 percent PVA binder and solid lines corresponding to briquettes made with 3 percent of a single binder (PVA-polyvinyl alcohol; wheat gel-pregelatinized wheat starch; WP-unmodified wheat starch; CP-unmodified corn starch).

Attrition indices are shown for the same briquetted samples in FIG. 19. These data reveal that adding 3 wt % of the 2:1 unmodified starch/PVA binder blends provides a resistance to attrition that is equivalent to that provided by the addition of 3 wt % PVA for initial moisture contents of 17.5% or greater and superior resistance at lower initial moistures despite the lower cost of the starch/PVA blends.

The implementations set forth in the foregoing description do not represent all implementations consistent with the subject matter described herein. Instead, they are merely some examples consistent with aspects related to the described subject matter.

Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows and steps for use described herein do not require the particular order shown, or sequential order, to achieve desirable results. Other embodiments can be within the scope of the claims.

What is claimed:

1. A method of preparing a product from a precursor material, comprising:
    mixing a particulate material with polyvinyl alcohol (PVA) and a binder comprising an unmodified starch to form a precursor material, wherein the binder is added at a ratio of at least 2:1 to PVA;
    irradiating said precursor material with microwave radiation and bringing said precursor material to a temperature of between 100-160° C. during irradiation to activate said precursor material and form an agglomerated product.

2. The method of claim 1, including selecting said particulate material from the group consisting of wood, paper, plastic, coal fines, biomass, 0-10 weight percent moisture bituminous coal fines, 10-30 weight percent moisture bituminous coal fines, sub-bituminous coal fines, lignite, anthracite coal fines, wheat straw, corn stover, switch grass, miscanthus, hemp, willow, sorghum, sugar cane, bamboo, poplar, oak, wood chips, saw dust, wood laminates, municipal solid waste, yard clippings, leaves and mixtures thereof.

3. The method of claim 1, including providing said precursor material with a moisture content of between 0-45 weight percent prior to activating by microwave radiation.

4. The method of claim 1, including providing said precursor material with a moisture content of between 15-35 weight percent prior to activating by microwave radiation.

5. The method of claim 1, including providing said precursor material with a moisture content of between 5-25 weight percent prior to activating by microwave radiation.

6. The method of claim 1, including bringing said precursor material to a temperature of between 100-125° C. during irradiating to activate said binder and form an agglomerated product.

7. The method of claim 2, comprising adding glycerol in combination with a second binder material selected from the group consisting of maleic anhydride, phthalic anhydride, other anhydrides and mixtures thereof wherein said weight ratio of glycerol to second binder material is between 2 to 1 and 1 to 2.

8. The method of claim 1, further comprising adding a second binder material selected from a group consisting of starch, corn starch, wheat starch, unmodified corn starch, unmodified wheat starch, pregelatinized corn starch, pregelatinized wheat starch and mixtures thereof wherein said weight ratio of polyvinyl alcohol to second binder material is between 1 to 0.1 and 1 to 10.

9. The method of claim 1, wherein said product is a fuel product and said mixing step includes mixing between 0-99.5 weight percent coal fines, 0-99.5 weight percent biomass and 0.5-10.0 weight percent binder.

10. The method of claim 8, wherein said weight ratio of polyvinyl alcohol to second binder material is between 1 to 1 and 1 to 4.

11. The method of claim 1, further comprising adding a second binder material selected from a group consisting of maleic anhydride, phthalic anhydride, other anhydrides and mixtures thereof wherein said weight ratio of glycerol to second binder material is between 2 to 1 and 1 to 2.

12. The method of claim 1 further including forming said fuel product into a briquette.

13. The method of claim 1, further including extruding said fuel product into an extrudate.

14. The method of claim 1, including forming said fuel product into a puck.

15. The method of claim 1, including forming said fuel product into a spherically-shaped pellet.

16. The method of claim 1, including compressing said fuel product into an agglomerated mass.

\* \* \* \* \*